June 17, 1958      L. S. GILLEO      2,839,206
GARBAGE TRUCK PACKING PLATE CONTROL
Filed Nov. 21, 1955
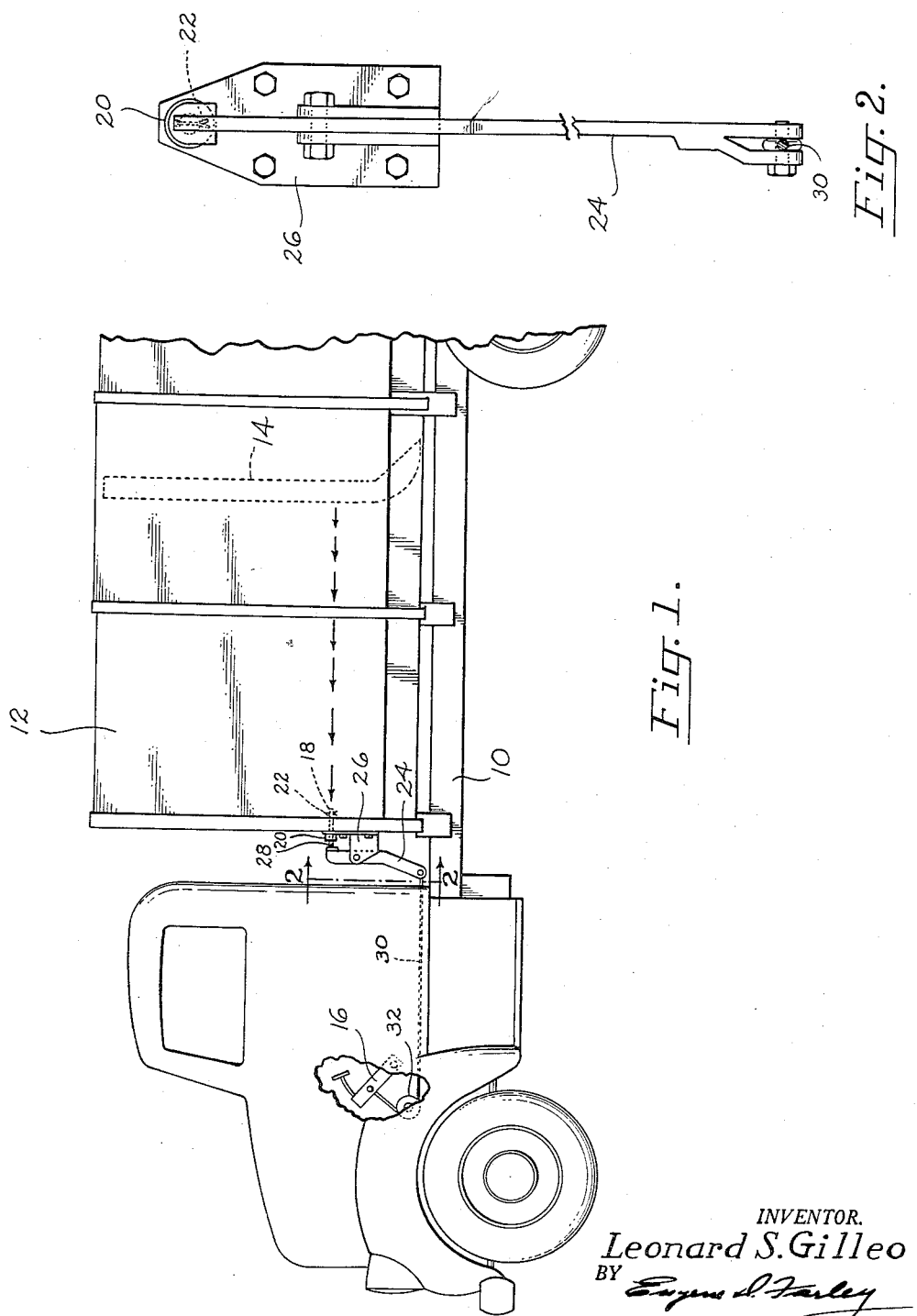
INVENTOR.
Leonard S. Gilleo

United States Patent Office 2,839,206
Patented June 17, 1958

2,839,206

GARBAGE TRUCK PACKING PLATE CONTROL

Leonard Sherman Gilleo, Portland, Oreg.

Application November 21, 1955, Serial No. 547,951

1 Claim. (Cl. 214—82)

This invention pertains to apparatus for preventing the over-running of garbage truck packing plates.

Garbage trucks of the class provided with plates for packing the contents of the truck require the presence of a control for preventing over-running of the plate when it reaches the end of its travel. This insures against damage to the plate, and particularly to the means employed for driving it. Conventionally such control is obtained by use of electrically operated limit switches. However, since such switches are rendered inoperative by battery failure, failure of the switch mechanism, or short circuiting, there is need for a simple mechanical device which may be operated by the movement of the packing plate and which acts effectively to prevent it from over-running. The present invention has for its general object the provision of such a device.

The manner in which the foregoing and other objects of this invention are accomplished will be apparent from the accompanying specification and claims considered together with the drawings wherein:

Fig. 1 is a view in side elevation of a garbage truck provided with a packing plate and with the herein described means for limiting the movement of the same; and Fig. 2 is a detailed view in front elevation taken along line 2—2 of Fig. 1 and illustrating further the control apparatus by means of which the movement of the packing plate is limited.

Generally stated, the herein described packing plate control apparatus comprises a contact element movably mounted through a wall of the body of a garbage truck. The contact element is stationed in the path of travel of the packing plate which reciprocates longitudinally within the body, so that it may be actuated by the packing plate at a predetermined limit of packing plate travel. Lever means is positioned adjacent the contact element and fulcrumed for movement upon contact therewith. Link means then interconnect the lever means and a clutch which is included in the driving assembly for the packing plate. As a consequence, when the lever is moved by the contact element the clutch is operated and the movement of the packing plate arrested.

Considering the foregoing in greater detail and with particular reference to the drawings:

The packing plate control apparatus of this invention is designed for application on a garbage truck of any suitable construction, an exemplary truck being illustrated in Fig. 1. As is usual with such vehicles, the truck includes a frame 10 on which is mounted a receptacular body 12 dimensioned for storing a quantity of refuse.

A packing plate 14 is mounted within the body for longitudintal reciprocation therein. This plate may be suitably designed and is driven by a motor, for example the motor of the vehicle, through a power take-off. The packing plate drive assembly also includes a clutch lever 16.

Journaled through the front end wall of body 12 is a contact element which in the illustrated form comprises a plunger 18. This plunger is movably mounted in suitable guide means 20, and is of sufficient length so that its inner end is contacted by packing plate 14 as the latter reaches its extreme limit of travel at the front of the truck body.

Suitable retaining means are provided for preventing plunger 18 from becoming dislodged. In the illustrated embodiment the retaining means comprises a cotter key 22 inserted through the end of the plunger.

A lever 24 pivoted intermediate its ends on a bracket 26 is positioned in such a manner that its upper end is spaced slightly apart from the outer end of plunger 18. As the plunger works in guide 20, it contacts a wear-member 28 on the upper end of the lever, thereby operating the lever.

The lower end of lever 24 is connected to a flexible link member 30 which passes around pulley 32 and is connected to clutch lever 16. Accordingly when packing plate 14 reaches the forward end of body 12 it extends plunger 18 through guide 20. This action in turn moves lever 24, displacing flexible link member 30 to the right as viewed in Fig. 1. The link member then depresses clutch pedal 16, which disconnects the packing plate drive and arrests the movement of the packing plate before any damage to the body or the plate occurs.

Having now described my invention in preferred embodiment, I claim as new and desire to protect by Letters Patent:

In a garbage truck provided with a receptacular body having a bottom and end walls and having mounted therein a reciprocable packing plate connected through clutch means to a motor: packing plate control apparatus comprising a plunger, means for mounting the plunger through one end wall of said body above the bottom thereof with one end of said plunger projecting inwardly of said body and stationed in the path of travel of the packing plate for actuation of the plunger by said packing plate at a predetermined limit of travel of the latter and with the other end of said plunger projecting exteriorly of said body, said plunger having reciprocable axial movement in the same direction of movement as said packing plate, a bracket mounted exteriorly on said one end wall, a lever fulcrumed intermediate its ends in said bracket and being disposed in a plane substantially parallel with said end wall, one end of said lever being positioned for contact by the opposite end of the plunger upon actuation of the plunger by the packing plate, and flexible link means interconnecting the other end of the lever and the clutch means for operating the same upon movement of the lever.

References Cited in the file of this patent

UNITED STATES PATENTS

| | | |
|---|---|---|
| 1,479,593 | Fantz | Jan. 1, 1924 |
| 1,961,587 | Hulley et al. | June 5, 1934 |
| 2,258,988 | Le Laurin | Oct. 14, 1941 |
| 2,760,658 | Smith | Aug. 28, 1956 |
| 2,777,588 | Williams | Jan. 15, 1957 |